May 28, 1935. C. DAVIES 2,002,936
FILTER
Filed July 28, 1932
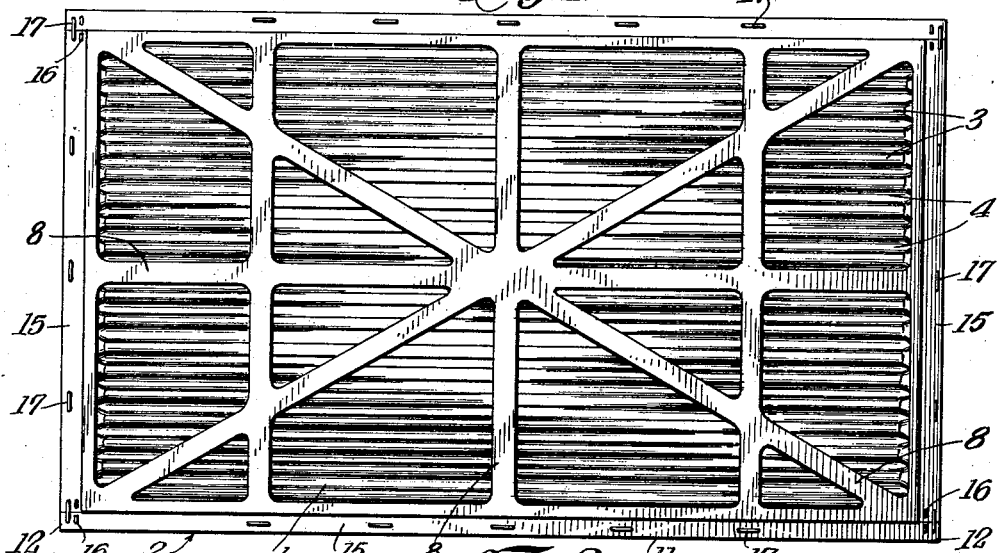
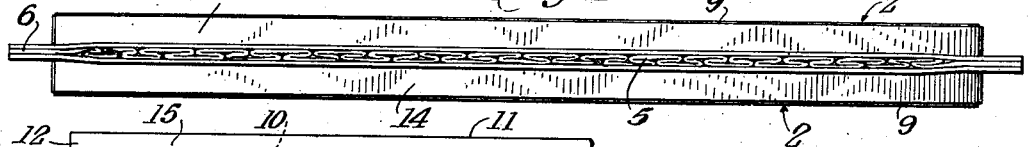
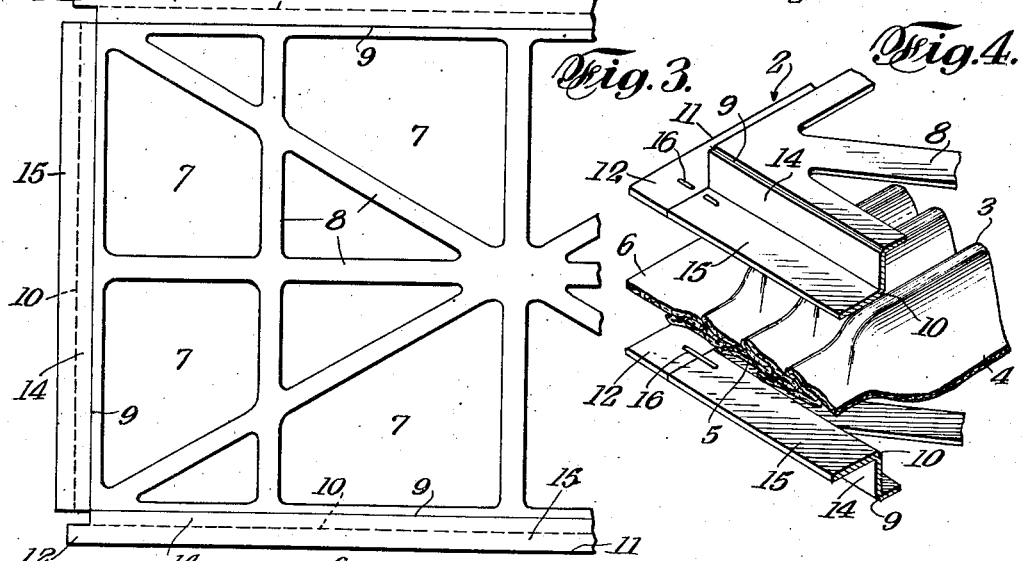
INVENTOR
Charles Davies
BY Wm Katz
ATTORNEY Patented May 28, 1935

2,002,936

UNITED STATES PATENT OFFICE 2,002,936

FILTER

Charles Davies, New York, N. Y.

Application July 28, 1932, Serial No. 625,229

5 Claims. (Cl. 183—71)

This invention relates to filters intended to be used for filtering air in ventilating systems. Such filters preferably comprise as filtering agent a body of vegetable fibre formed with a corrugated or zig-zag cross-section. In ordinary use these filters must be replaced periodically. In view of the weakness and lack of rigidity of the material, it is desirable to provide a filter which may be inserted, removed, shipped and otherwise handled as a self-contained, form-retaining unit.

The main object of my invention, therefore, is to provide a filter insert simple in construction and manufacture, and constituting a complete unit convenient to handle.

A further object of my invention is to provide a corrugated filter which may be easily set in place in the ventilating system; and shall avoid the necessity for complexity in the supporting structure in the latter. To this end my filter comprises a central corrugated filter portion and a flat edge portion adapted, in use, to rest against and be supported by a simple flange.

Other and further objects of my invention will become apparent from the description below of the preferred embodiment of my invention which is illustrated in the drawing.

This application is a continuation, as to part of its subject matter, of my prior application 577,177 for Filters, filed Nov. 25, 1931, which has matured into Patent No. 1,890,499, dated Dec. 13, 1932.

In the drawing:

Fig. 1 is a plan view of my filter insert.

Fig. 2 is a side view of the same.

Fig. 3 is a view showing a portion of the blank for the frame or cap.

Fig. 4 is an exploded view in perspective of one corner of the filter insert.

Fig. 5 is a cross-section taken transverse to the corrugations of a part of the central portion of the filter insert.

My filter insert comprises generically a body of filtering material held between two symmetrical cardboard frames 2, 2 having open work central portions to permit the passage of air through the filter. The body of filtering material 1, which may be of cellulose, cotton batting or similar fibrous material is formed with a corrugated or zig-zag cross-section which, when viewed from either face, presents a parallel series of successive crests or ridges 3 and valleys 4. At the ends of the corrugations the crests on each side are crushed inwards so as to be spread and overlapped and thus form a flat rim for the filter lying midway between the crests. The first and last of the series of corrugations are flattened out as at 6 to provide flat edges at what may be called the front and back of the filter.

The frames 2 are made of cardboard and may be blanked out as shown in Fig. 3. The central portion is cut out of a rectangular sheet to provide large openings 7 to permit the passage of air unhindered through the filter; and at the same time to leave sufficient cross and diagonal strips of material 8 to form an effective guard against bowing and blowing out of the body 1 of the filter. The cardboard sheet is scored on its upper face as at 9; and on its lower face as at 10 parallel to and at the same distance in all cases from the scores 9. At each corner an L-shaped piece is cut out so as to provide at opposite edges 11 a laterally extending tab 12 of proper dimensions. The blank is then bent along the scores so that at each side there is a downwardly extending flange 14 followed by an outwardly extending flange 15. When thus bent the tab 12 matches with one of the flanges 15 and may be stapled thereto as at 16 to form a rigid structure comprising a hollow, elevated or dished up central portion adapted to house and guard the crests of the corrugations, and a laterally extending rim 15, 15 adapted to overlie the flat rim 5, 6 of the filter body.

The filter body 1 is placed between two of these frames 2; and the whole structure is firmly held together by a series of staples 17 passing through opposed flanges 15, or by any other suitable means. It is clear that several of the steps in the manufacture of the filter insert may be readily combined. Thus the flattening of the edge of the filter body may be done at the time it is clamped between the frames.

I claim as my invention:

1. A filter comprising a body of filtering material shaped to provide a central filtering portion of zig-zag cross-section and a smooth rim portion encircling the central portion intermediate the crests of the zig-zags.

2. A filter comprising a central filtering portion of zig-zag cross-section and a smooth rim portion encircling the central portion intermediate the crests of the sig-zags.

3. A filter comprising a body of filtering material shaped to provide a central filtering portion having a series of transverse corrugations and a smooth rim portion encircling the central portion intermediate the crests of the corrugations.

4. A filter unit comprising a corrugated body of filtering material, and a casing comprising two oppositely disposed relatively rigid members, each member comprising an upstanding open-faced central portion to accommodate the corrugations and an outwardly extending flange encircling the central portion, and means to secure the filter body between the casing members.

5. An independent filter unit comprising a filter body having a central portion of zig-zag cross-section and a smooth rim portion encircling the central portion intermediate the crests of the zig-zags, and a frame for the filter comprising oppositely disposed members, each member having a dished-up center to accommodate the crests of the zig-zags and an outwardly extending flange, and means for securing the rim of the filter between the flanges of the frame members.

CHAS. DAVIES.